US011881343B2

(12) United States Patent
Khenkin et al.

(10) Patent No.: US 11,881,343 B2
(45) Date of Patent: Jan. 23, 2024

(54) LAYERED PROCESS-CONSTRUCTED DOUBLE-WINDING EMBEDDED SOLENOID INDUCTOR

(71) Applicant: Cirrus Logic International Semiconductor Ltd., Edinburgh (GB)

(72) Inventors: Aleksey S. Khenkin, Austin, TX (US); David Patten, Austin, TX (US); Jun Yan, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 454 days.

(21) Appl. No.: 17/173,486

(22) Filed: Feb. 11, 2021

(65) Prior Publication Data

US 2021/0287841 A1 Sep. 16, 2021

Related U.S. Application Data

(60) Provisional application No. 62/989,076, filed on Mar. 13, 2020.

(51) Int. Cl.
*H01F 7/06* (2006.01)
*H01F 27/28* (2006.01)
(Continued)

(52) U.S. Cl.
CPC ..... *H01F 27/2804* (2013.01); *H01F 17/0013* (2013.01); *H01F 27/24* (2013.01); *H01F 41/08* (2013.01)

(58) Field of Classification Search
CPC .. H01F 27/24; H01F 27/2804; H01F 17/0013; H01F 17/0033; H01F 41/046;
(Continued)

(56) References Cited

U.S. PATENT DOCUMENTS 8,350,657 B2 * 1/2013 deRochemont ...... H01C 17/003 336/200
10,276,300 B2 * 4/2019 Bergquist .............. H02M 7/003
(Continued)

FOREIGN PATENT DOCUMENTS

EP 1089302 4/2001

OTHER PUBLICATIONS

Hikmat, Omer Faris et al. "RF MEMS Inductors and Their Applications—A Review." *Journal of Microelectromechanical Systems*. vol. 26, No. 1. Feb. 2017. pp. 17-44.
(Continued)

*Primary Examiner* — Paul D Kim
(74) *Attorney, Agent, or Firm* — E. Alan Davis; Huffman Law Group, PC

(57) ABSTRACT

A method for constructing a solenoid inductor includes positioning an inner winding substantially around a magnetic core, positioning an outer winding substantially around the inner winding, and using a layered process to perform said positioning the inner and outer windings. The layered process includes processing a first conducting layer as a bottom layer of the outer winding, above processing a first dielectric layer, above processing a second conducting layer as a bottom layer of the inner winding, above processing a second dielectric layer, above processing a magnetic core layer, above processing a third dielectric layer, above processing a third conducting layer as a top layer of the inner winding, above processing a fourth dielectric layer, above processing a fourth conducting layer as a top layer of the outer winding, above processing a fifth dielectric layer, and the inner and outer windings are electrically connected.

22 Claims, 7 Drawing Sheets

(51) Int. Cl.
*H01F 17/00* (2006.01)
*H01F 27/24* (2006.01)
*H01F 41/08* (2006.01)

(58) Field of Classification Search
CPC ............. H01F 41/08; H01F 2017/0066; H01F 2017/0086
See application file for complete search history.

(56) References Cited

U.S. PATENT DOCUMENTS

| | | | |
|---|---|---|---|
| 2014/0264734 | A1 | 9/2014 | Luo et al. |
| 2018/0366258 | A1 | 12/2018 | Otsubo et al. |
| 2019/0393403 | A1 | 12/2019 | Doy |
| 2020/0204073 | A1 | 6/2020 | Lawrence et al. |
| 2020/0204076 | A1 | 6/2020 | Melanson et al. |

OTHER PUBLICATIONS

Lee, Dok Won et al. "Fabrication and Analysis of High-Performance Integrated Solenoid Inductor With Magnetic Core." *IEEE Transactions on Magnetics*. vol. 44, No. 11. Nov. 2008. pp. 4089-4095.
Le, Hoa Thanh et al. "Fabrication of 3D air-core MEMS inductors for very-high-frequency power conversions." *Microsystems & Nanoengineering*. vol. 3. 2017. pp. 1-9.
"Manufacturing Process of Inductors" TDK. Downloaded on Feb. 27, 2020 at https: //www.tdk.com/news_center/publications/inductors_world/pdf/aaa60312.pdf p. 1.
"PM3340 Series—SMD Power Inductors" Bourns® Datasheet. Downloaded on Feb. 8, 2021 at https://www.bourns.com/docs/Product-Datasheets/pm3340_series.pdf. pp. 1-4.

* cited by examiner

LAYERED PROCESS-CONSTRUCTED DOUBLE-WINDING EMBEDDED SOLENOID INDUCTOR

CROSS REFERENCE TO RELATED APPLICATION(S)

This application claims priority based on U.S. Provisional Application, Ser. No. 62/989,076, filed Mar. 13, 2020, entitled LAYERED PROCESS-CONSTRUCTED DOUBLE-WINDING EMBEDDED SOLENOID INDUCTOR, which is hereby incorporated by reference in its entirety.

BACKGROUND

Inductors are important elements in many electronic applications. Historically, inductors have been employed in radio frequency and machinery-related applications, for example. More recently, inductors are being employed in cell phones, laptops, and medical equipment, for example. Embedded inductors are desirable in many of these applications. Inductors come in many shapes and sizes, such as planar inductors, toroidal inductors, spiral inductors, etc. One type of inductor that has seen increasing demand is embedded solenoid inductors with magnetic cores. Due to the space requirements of many applications, a demand has appeared for embedded solenoid inductors with an increased inductance to size ratio.

SUMMARY

Embodiments are described of a method for constructing an embedded solenoid inductor by using a layered process to position an inner winding around a magnetic core and to position an outer winding around the inner winding. The layered process includes processing a bottom conducting layer of the outer winding, processing above that a first dielectric layer, processing above that a bottom conducting layer of the inner winding, processing above that a second dielectric layer, processing above that a magnetic core layer, processing above that a third dielectric layer, processing above that a top conducting layer of the inner winding, processing above that a fourth dielectric layer, processing above that a top conducting layer of the outer winding, processing above that a fifth dielectric layer, and the inner and outer windings are electrically connected. The process may also include processing vertical conductors through the first, second, third and fourth dielectric layers to electrically connect the bottom and top layers of the outer winding and processing vertical conductors through the second and third dielectric layers to electrically connect the bottom and top layers of the inner winding. The process may also include, for each conducting layer: separating the conducting layer into multiple conductors, using some of the vertical conductors to electrically connect corresponding ones of the multiple conductors of the bottom and top layers of the outer winding to form corresponding turns of the outer winding, and using some of the vertical conductors to electrically connect corresponding ones of the multiple conductors of the bottom and top layers of the inner winding to form corresponding turns of the inner winding. The inner and outer windings may be connected to generate non-opposing magnetic fields in the magnetic core, or they may be connected to generate opposing magnetic fields in the magnetic core. In the case of opposing magnetic fields, the inner and outer windings may have different numbers of turns to provide substantially matching inductance values. The layered process may be used to position an even number of additional windings around the inner and outer windings such that each successive additional winding is substantially positioned around the previous additional windings. The layered process may be used to construct the solenoid inductor as an integrated circuit device, as a discrete device, as a component of an integrated circuit package with one or more active or passive devices, or as a component of a multilayer laminate printed circuit board (PCB).

In one embodiment, the present disclosure provides a method for constructing a solenoid inductor that includes positioning an inner winding substantially around a magnetic core, positioning an outer winding substantially around the inner winding, and using a layered process to perform said positioning the inner and outer windings. The method may further include processing a first conducting layer that is a bottom layer of the outer winding, processing a first dielectric layer above the first conducting layer, processing a second conducting layer above the first dielectric layer that is a bottom layer of the inner winding, processing a second dielectric layer above the second conducting layer, processing a magnetic core layer above the second dielectric layer, processing a third dielectric layer above the magnetic core layer, processing a third conducting layer above the third dielectric layer that is a top layer of the inner winding, processing a fourth dielectric layer above the third conducting layer, processing a fourth conducting layer above the fourth dielectric layer that is a top layer of the outer winding, processing a fifth dielectric layer above the fourth conducting layer, and the inner and outer windings are electrically connected. The method may further include that the inner and outer windings are electrically connected serially and in such a manner as to generate non-opposing magnetic fields in the magnetic core. The method may further include that the inner and outer windings are electrically connected in such a manner as to generate opposing magnetic fields in the magnetic core. The method may further include that the solenoid inductor is constructed as an integrated circuit device. The method may further include that the solenoid inductor is constructed as a discrete device. The method may further include that the solenoid inductor is constructed as a component of an integrated circuit package with one or more active or passive devices. The method may further include that the solenoid inductor is constructed as a component of a multilayer laminate printed circuit board.

In other embodiments, the present disclosure provides solenoid inductors constructed according to the methods above.

DETAILED DESCRIPTION

Figure 5:
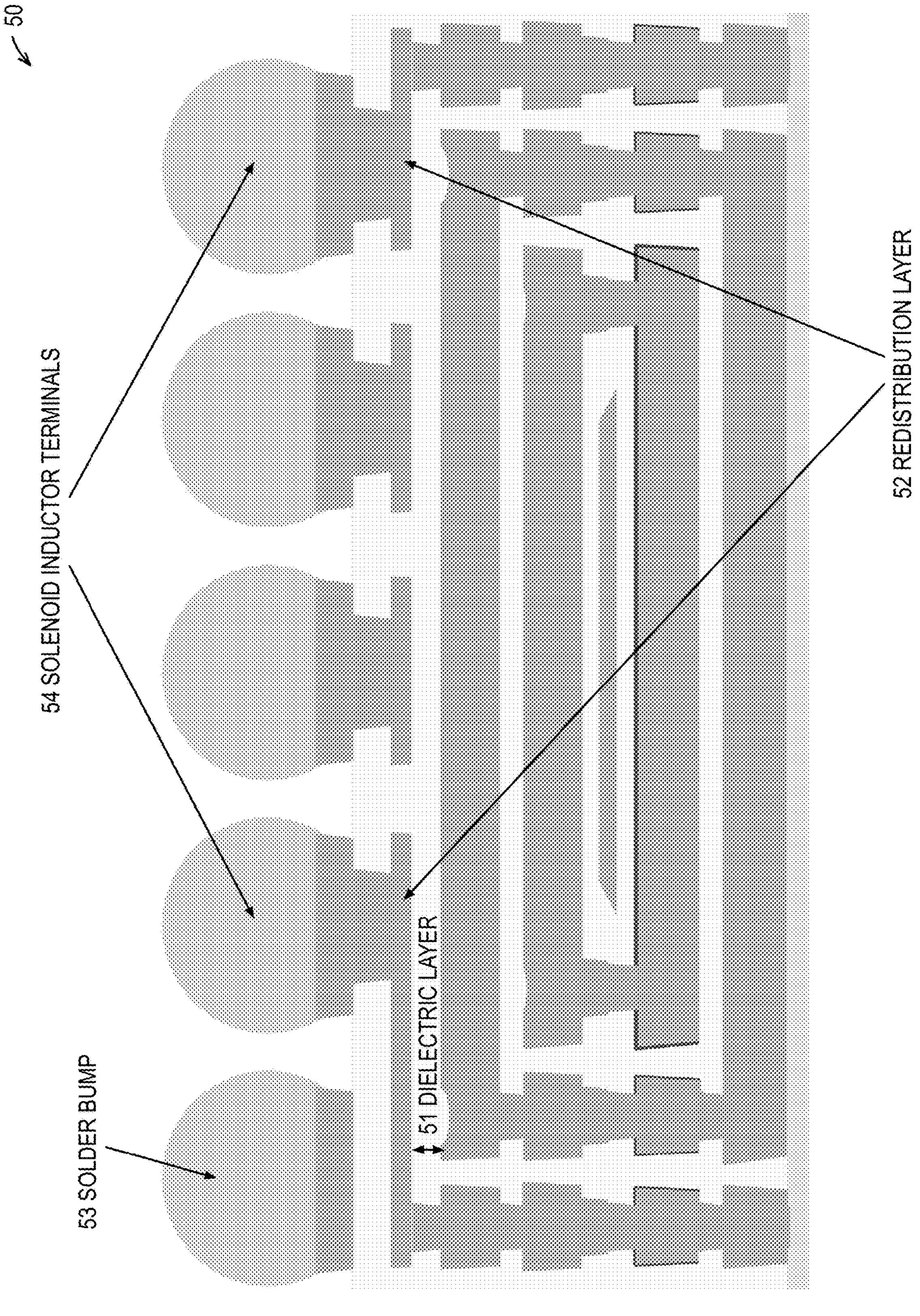
FIG. 5 is a simulated longitudinal 2-dimensional cross-section illustration of an example of an embedded double-winding solenoid inductor constructed using a layered process, e.g., of FIG. 1, in accordance with embodiments of the present disclosure.

Described herein are embodiments of methods for constructing an embedded double-winding solenoid inductor that include positioning an outer winding around an inner winding that is positioned around a magnetic core. The layered process may also include positioning a redistribution layer (RDL) to connect the solenoid inductor terminals to input/output pads of an integrated circuit (e.g., as shown in FIG. 5).

Figure 1:
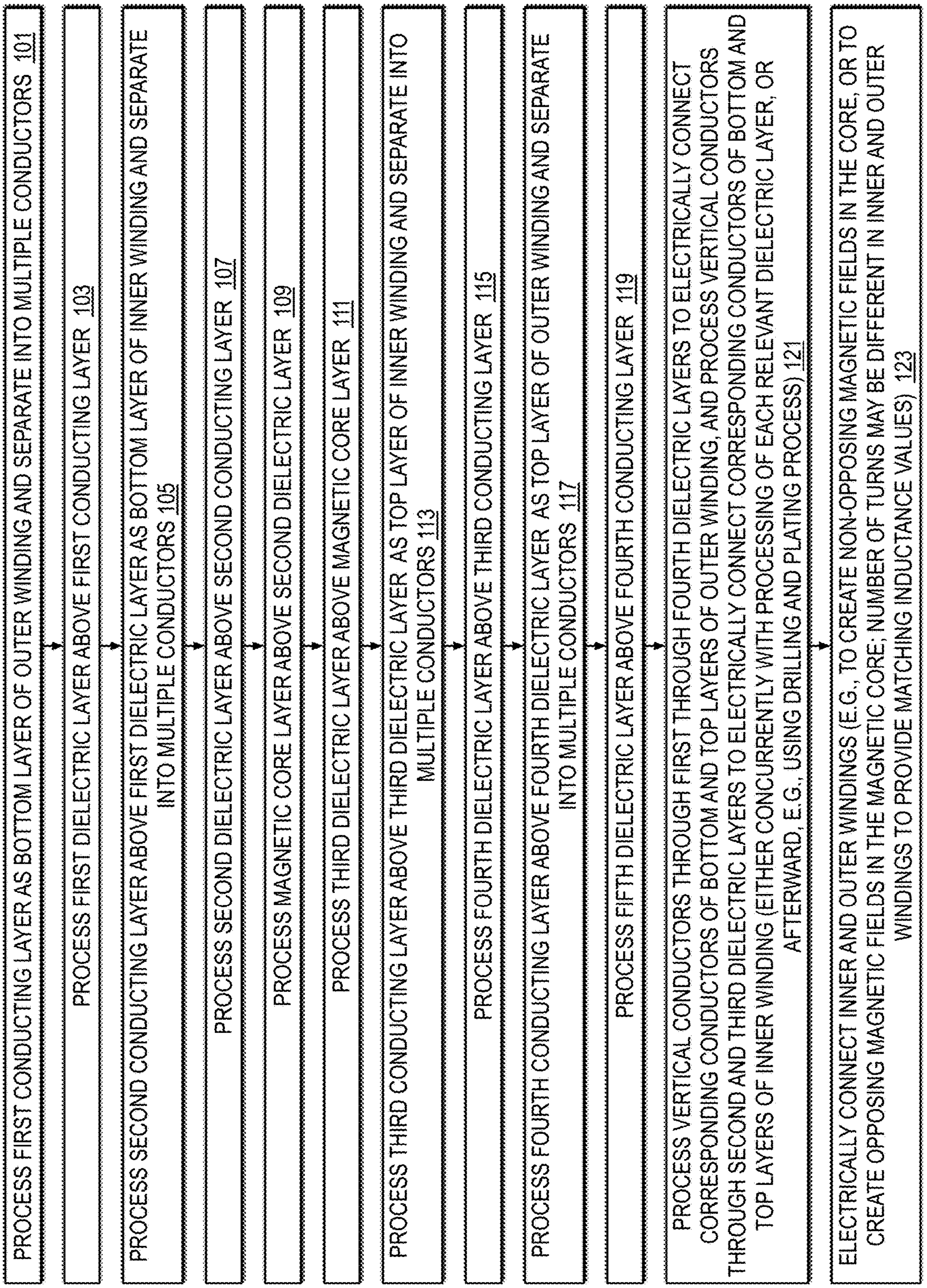
FIG. 1 is a flow diagram illustrating an example method for constructing an embedded double-winding solenoid inductor using a layered process in accordance with embodiments of the present disclosure.

FIG. 1 is a flow diagram illustrating an example method for constructing an embedded double-winding solenoid inductor using a layered process in accordance with embodiments of the present disclosure. In one embodiment, the layered process may be a planar process that includes one or more of the steps of photolithography, chemical vapor deposition, and etching, for example, in order to process the various conducting and dielectric layers and vertical conductors. In another embodiment, the layered process may be a process for constructing the solenoid inductor as a component of a multilayer laminate printed circuit board (PCB) that includes one or more of the steps of copper patterning, chemical etching, lamination, drilling, printing, laser ablation, plating and coating. The method begins at block 101.

At block 101, a first conducting layer is processed as a bottom layer of an outer winding of the solenoid inductor. In one embodiment, the first conducting layer may be processed on top of a passivated semiconductor (e.g., silicon) substrate. In another embodiment, the bottom layer may be processed on top of an insulating material layer of a PCB. The processing of the first conducting layer includes separating the first conducting layer into multiple conductors running in parallel with one another separated by dielectric material.

At block 103, a first dielectric layer is processed above the first conducting layer.

At block 105, a second conducting layer is processed as a bottom layer of an inner winding of the solenoid inductor. The processing of the second conducting layer includes separating the second conducting layer into multiple conductors running in parallel with one another separated by dielectric material.

At block 107, a second dielectric layer is processed above the second conducting layer.

At block 109, a magnetic core layer is processed above the second dielectric layer. Preferably, the magnetic core material is a magnetic material such as, for example, CoZrTa, although other materials may be used as known to those skilled in the art.

At block 111, a third dielectric layer is processed above the magnetic core layer.

At block 113, a third conducting layer is processed as a top layer of the inner winding of the solenoid inductor. The processing of the third conducting layer includes separating the third conducting layer into multiple conductors running in parallel with one another separated by dielectric material.

At block 115, a fourth dielectric layer is processed above the third conducting layer.

At block 117, a fourth conducting layer is processed as a top layer of the outer winding of the solenoid inductor. The processing of the fourth conducting layer includes separating the fourth conducting layer into multiple conductors running in parallel with one another separated by dielectric material.

At block 119, a fifth dielectric layer is processed above the fourth conducting layer.

At block 121, vertical conductors are processed through the first, second, third and fourth dielectric layers to electrically connect the corresponding conductors of the bottom and top layers of the outer winding that were processed at blocks 101 and 117, i.e., to create corresponding turns of the outer winding. Additionally, vertical conductors are processed through the second and third dielectric layers to electrically connect the corresponding conductors of the bottom and top layers of the inner winding that were processed at blocks 105 and 113, i.e., to create corresponding turns of the inner winding. In one embodiment, the vertical conductors are processed concurrently with the processing of each relevant dielectric layer, e.g., a lowest portion of the outer winding vertical conductors may be processed in holes etched from the first dielectric layer, a next higher portion of the outer winding vertical conductors may be processed in holes etched from the second dielectric layer, a next higher portion of the outer winding vertical conductors may be processed in holes etched from the third dielectric layer, and a highest portion of the outer winding vertical conductors may be processed in holes etched from the fourth dielectric layer. Similarly, a lowest portion of the inner winding vertical conductors may be processed in holes etched from the second dielectric layer, and a highest portion of the inner winding vertical conductors may be processed in holes etched from the third dielectric layer. In another embodiment, the vertical conductors are processed afterward, e.g., using a drilling and plating process. In one embodiment, holes are made in the dielectric material (e.g., using photolithography, mechanical drilling, laser oblation, chemical etch, etc.), then the holes are filled with conductive material to process the vertical conductors. The vertical conductors may be processed using plating, printing, or laminating. In one embodiment, a pillar may be plated up and then coated or laminated with dielectric material, then the dielectric material may be removed to uncover the vertical conductor, and then the next conducting layer may be formed.

At block 123, the inner and outer windings are electrically connected. In one embodiment, the inner and outer windings are electrically connected in a manner that creates non-opposing magnetic fields in the magnetic core when current runs through the windings. In another embodiment, the inner and outer windings are electrically connected in a manner that creates opposing magnetic fields in the magnetic core when current runs through the windings. In one embodiment, the number of turns in the inner and outer windings may be different and calculated to provide matching inductance values of the inner and outer windings.

Although the steps described are generally performed sequentially, some of the steps may be performed in a different order. For example, as described above, the step at block 121 of processing the vertical conductors may be performed in a sequential manner or may be performed substantially in conjunction with the steps at other blocks. Uses of an embedded dual-winding solenoid inductor constructed according to the method of FIG. 1 may include, but are not limited to, power converters, filters, resonators, etc. that may be used in audio, RF, signal processing, etc.

Figure 2:
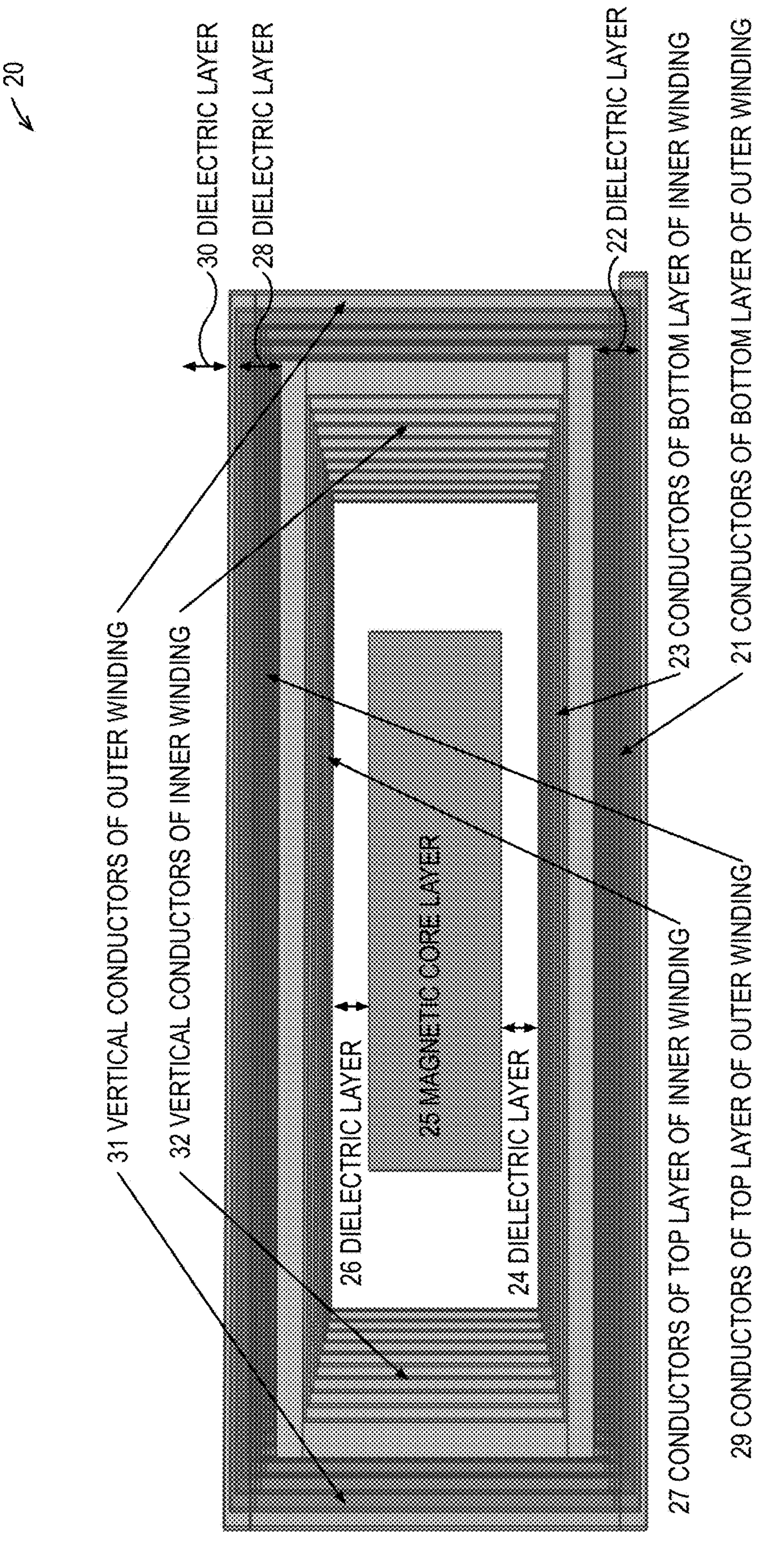
FIG. 2 is a simulated 3-dimensional illustration of an example embedded double-winding solenoid inductor constructed using a layered process, e.g., of FIG. 1, in accordance with embodiments of the present disclosure.

FIG. 2 is a simulated 3-dimensional illustration of an example of an embedded double-winding solenoid inductor 20 constructed using a layered process, e.g., of FIG. 1, in accordance with embodiments of the present disclosure. The solenoid inductor 20 includes conductors of a bottom conducting layer of an outer winding 21, e.g., as processed according to block 101 of FIG. 1. The solenoid inductor 20 includes a first dielectric layer 22, e.g., as processed according to block 103 of FIG. 1, above the bottom conducting layer of the outer winding 21; conductors of a bottom conducting layer of an inner winding 23, e.g., as processed according to block 105 of FIG. 1, above the first dielectric layer 22; a second dielectric layer 24, e.g., as processed according to block 107 of FIG. 1, above the bottom conducting layer of the inner winding 23; a magnetic core layer 25, e.g., as processed according to block 109 of FIG. 1, above the second dielectric layer 24; a third dielectric layer 26, e.g., as processed according to block 111 of FIG. 1, above the magnetic core layer 25; conductors of a top conducting layer of the inner winding 27, e.g., as processed according to block 113 of FIG. 1, above the third dielectric layer 26; a fourth dielectric layer 28, e.g., as processed according to block 115 of FIG. 1, above the top conducting layer of the inner winding 27; conductors of a top conducting layer of the outer winding 29, e.g., as processed according to block 117 of FIG. 1, above the fourth dielectric layer 28; a fifth dielectric layer 30, e.g., as processed according to block 119 of FIG. 1, above the top conducting layer of the outer winding 29; and vertical conductors of the outer winding 31 that electrically connect corresponding conductors of the bottom and top layers of the outer winding and vertical conductors of the inner winding 32 that electrically connect corresponding conductors of the bottom and top layers of the inner winding, e.g., as processed according to block 121 of FIG. 1. The electrical connection of the inner and outer windings, e.g., as processed according to block 123 of FIG. 1, is not shown in FIG. 2.

Figure 3:
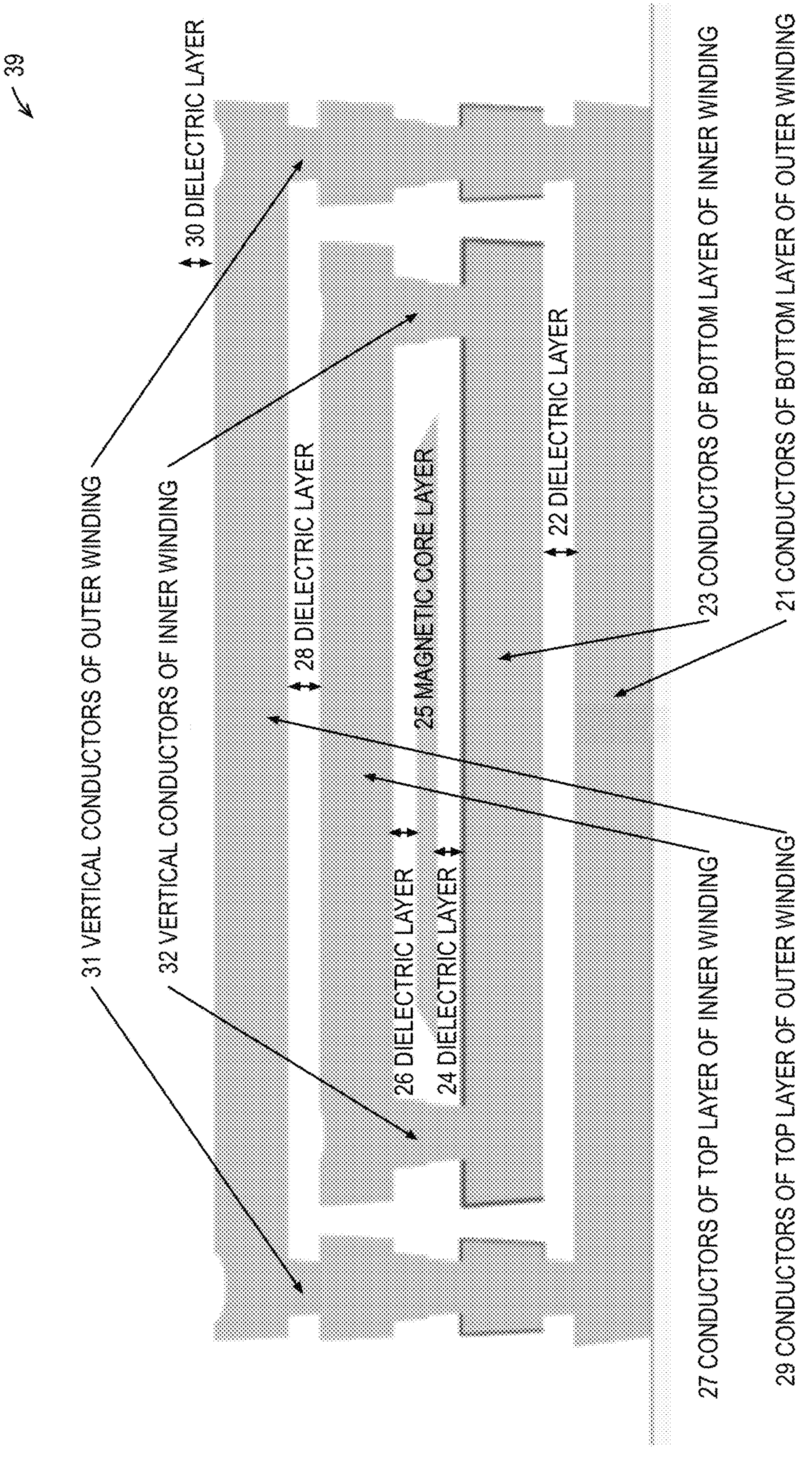
FIG. 3 is a simulated longitudinal 2-dimensional cross-section illustration of an example of an embedded double-winding solenoid inductor constructed using a layered process, e.g., of FIG. 1, in accordance with embodiments of the present disclosure.

FIG. 3 is a simulated longitudinal 2-dimensional cross-section illustration of an example of an embedded double-winding solenoid inductor 39 constructed using a layered process, e.g., of FIG. 1, in accordance with embodiments of the present disclosure. As shown, the solenoid inductor 39 includes corresponding portions of the solenoid inductor 20 of FIG. 2, namely, conductors of the bottom conducting layer of the outer winding 21, the first dielectric layer 22, conductors of the bottom conducting layer of the inner winding 23, the second dielectric layer 24, the magnetic core layer 25, the third dielectric layer 26, conductors of the top conducting layer of the inner winding 27, the fourth dielectric layer 28, conductors of the top conducting layer of the outer winding 29, the fifth dielectric layer 30, and vertical conductors of the outer winding 31 and vertical conductors of the inner winding 32, e.g., as processed according to blocks 101 through 121 of FIG. 1.

Figure 4:
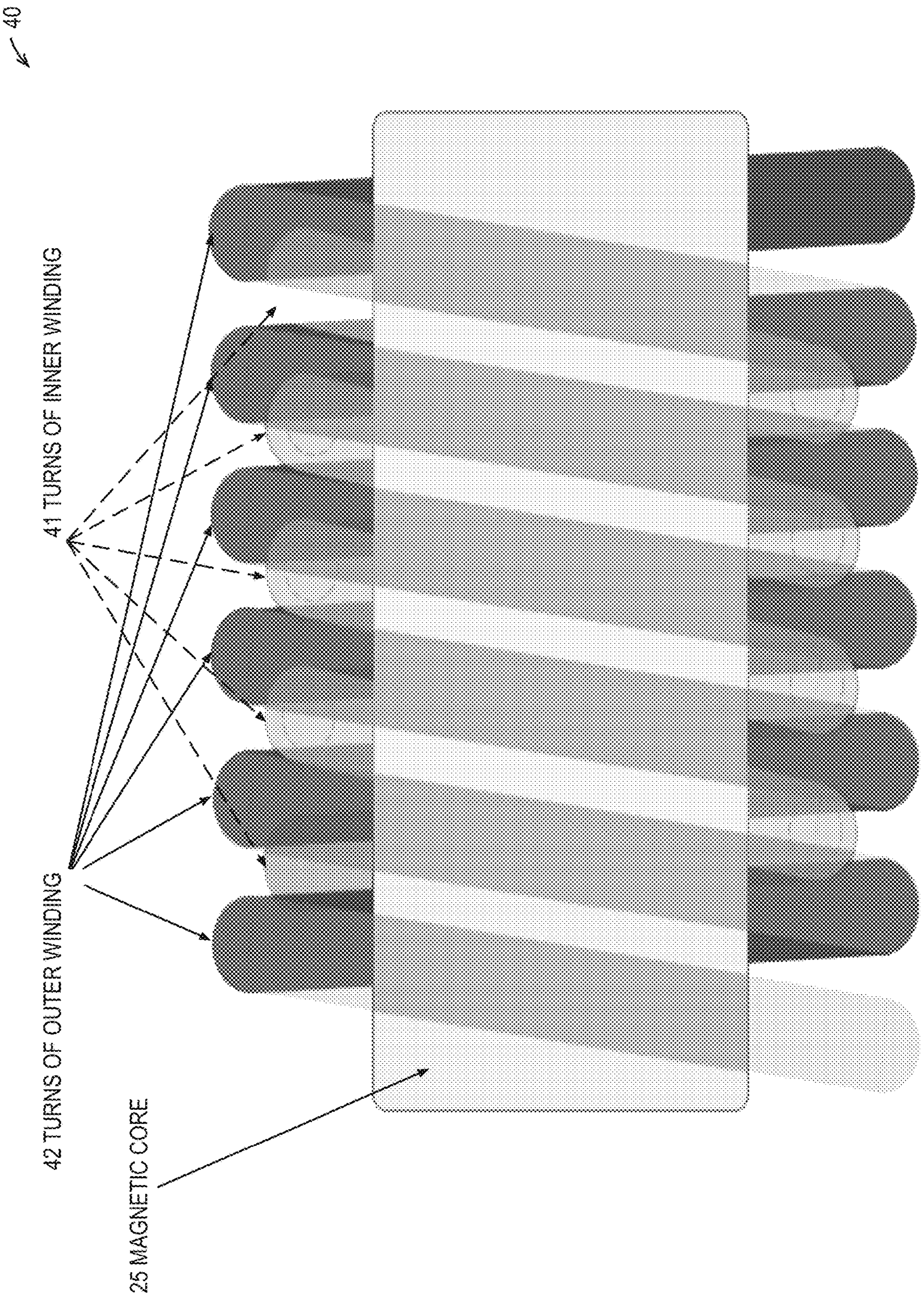
FIG. 4 is a simulated top-down view illustration of an example of an embedded double-winding solenoid inductor constructed using a layered process, e.g., of FIG. 1, in accordance with embodiments of the present disclosure.

FIG. 4 is a simulated to-down view illustration of an example of an embedded double-winding solenoid inductor 40 constructed using a layered process, e.g., of FIG. 1, in accordance with embodiments of the present disclosure. As shown, the solenoid inductor 40 includes the magnetic core layer 25, turns of the inner winding 41 comprising the conductors of the bottom and top conducting layers and vertical conductors of the inner winding (e.g., elements 23, 27 and 32 of FIG. 2) and turns of the outer winding 42 comprising the conductors of the bottom and top conducting layers and vertical conductors of the outer winding (e.g., elements 21, 29 and 31 of FIG. 2), e.g., as processed according to blocks 101 through 121 of FIG. 1.

FIG. 5 is a simulated longitudinal 2-dimensional cross-section illustration of an example of an embedded double-winding solenoid inductor 50 constructed using a layered process, e.g., of FIG. 1, in accordance with embodiments of the present disclosure. The solenoid inductor 50 of FIG. 5 is similar in many respects to the solenoid inductor 39 of FIG. 3 and corresponding elements are not numbered. Also shown in FIG. 5 are solder bumps 53, e.g., of a chip or integrated circuit package for connection with a system, e.g., to a PCB. The chip or integrated circuit package in which the embedded double-winding solenoid inductor 50 is a component may include one or more active or passive devices that may be connected to the embedded double-winding solenoid inductor 50. Alternatively, the embedded double-winding solenoid inductor 50 may be constructed as a discrete device. The solenoid inductor 50 of FIG. 5 also includes an additional dielectric layer 51 above the top conducting layer of the outer winding that separates it from a redistribution layer (RDL) 52 of conducting material. A first portion of the RDL 52 is connected to one end of the outer winding and a second portion of the RDL 52 is connected to the other end of the outer winding. The first portion of the RDL 52 is also connected to a first input/output pin that is connected to a first solder bump that is a first terminal 54 of the solenoid inductor 50, and the second portion of the RDL 52 is also connected to a second input/output pin that is connected to a second solder bump that is a second terminal 54 of the solenoid inductor 50.

Figure 6:
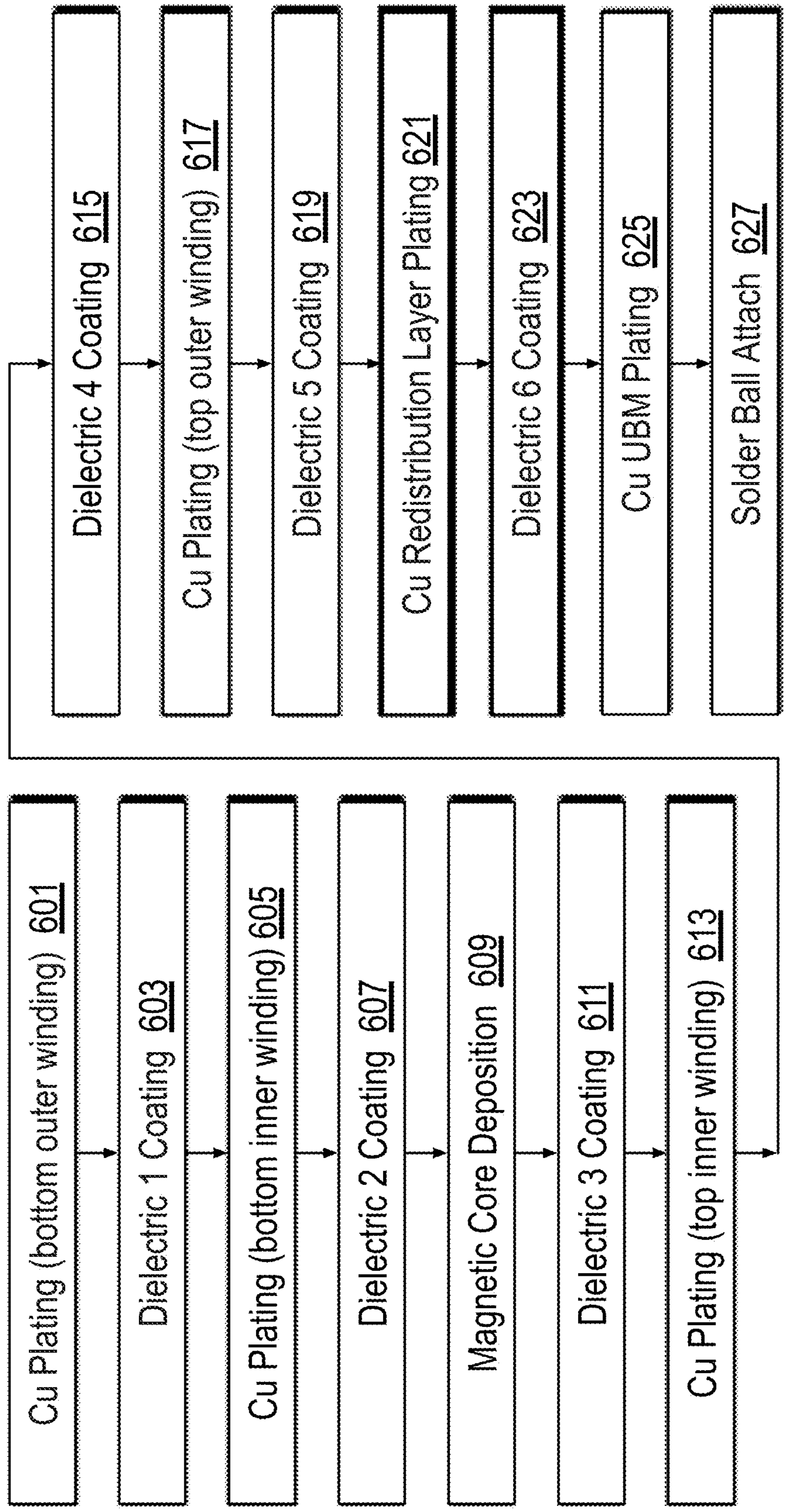
FIG. 6 is a flow diagram illustrating an example method for constructing an embedded double-winding solenoid inductor using a layered process in accordance with embodiments of the present disclosure.

FIG. 6 is a flow diagram illustrating an example method for constructing an embedded double-winding solenoid inductor using a layered process in accordance with embodiments of the present disclosure. In the embodiment of FIG. 6, the layered process is a planar process that includes the use of physical vapor deposition (PVD), photolithography, plating, etching, coating, curing, chemical vapor deposition (CVD), and other process steps to process the various conducting and dielectric layers and vertical conductors. The method includes odd-numbered steps 601 through 627. Generally, steps 601 and 603 and 617 and 619 are directed to positioning the outer winding (e.g., of FIGS. 2 through 5) essentially corresponding to blocks 101, 103, 115, 117 and 121 of FIG. 1. Generally, steps 605 and 607 and 611 through 615 are directed to positioning the inner winding (e.g., of FIGS. 2 through 5) essentially corresponding to blocks 105, 107, 111, 113 and 121 of FIG. 1. Generally, step 609 is directed to positioning the magnetic core (e.g., of FIGS. 2 through 5) essentially corresponding to block 109 of FIG. 1. Generally, steps 621 through 627 are directed to positioning the RDL, I/O pins and solder bumps (e.g., of FIG. 6).

Figure 7:
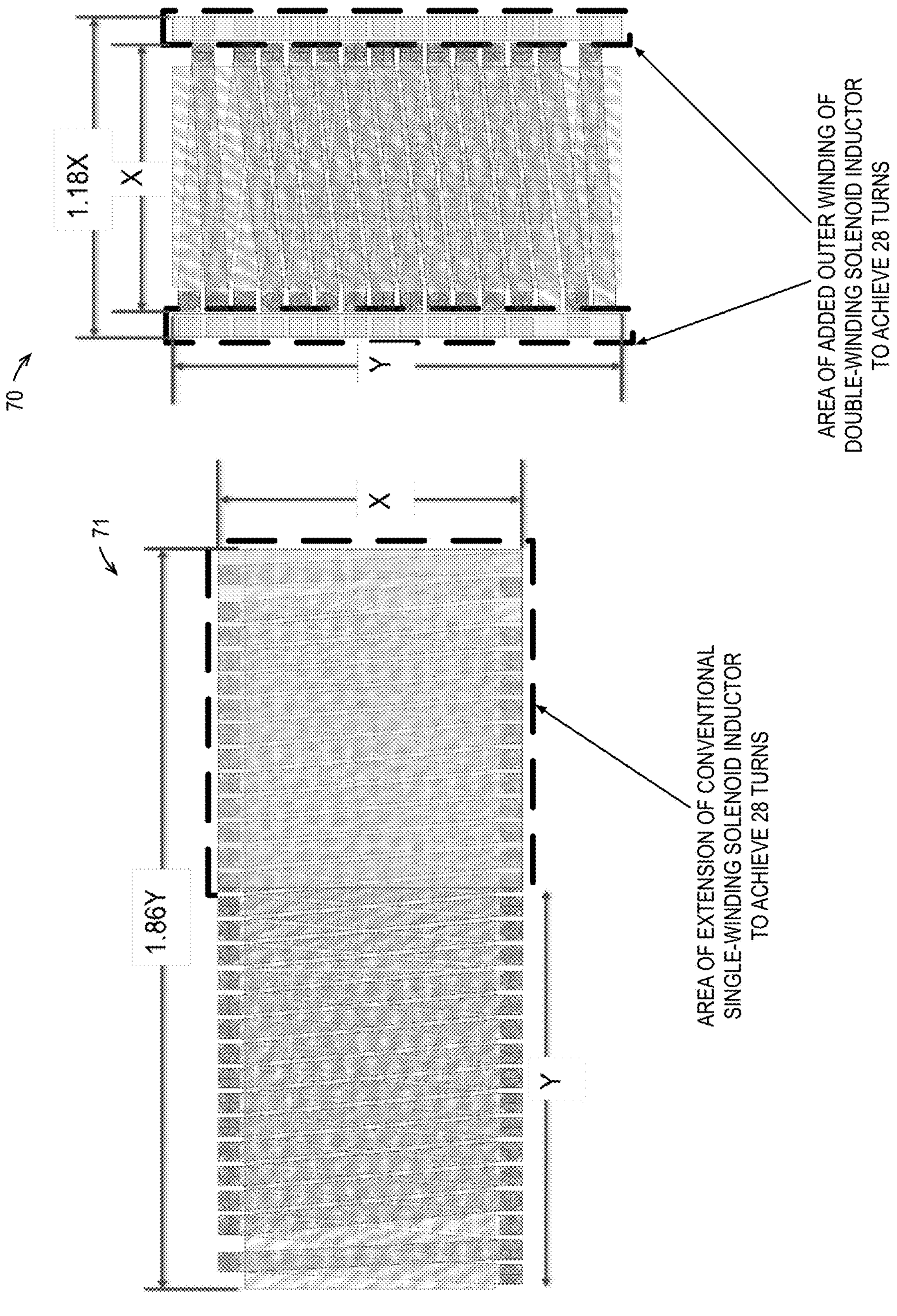
FIG. 7 is a simulated 2-dimensional top view illustration of an example of an embedded double-winding solenoid inductor 70 constructed using a layered process, e.g., of FIG. 1, in accordance with embodiments of the present disclosure.

FIG. 7 is a simulated 2-dimensional top view illustration of an example of an embedded double-winding solenoid inductor 70 constructed using a layered process, e.g., of FIG. 1, in accordance with embodiments of the present disclosure. FIG. 7 also includes a simulated 2-dimensional top view illustration of an example of a conventional double-winding solenoid inductor 71 having a similar inductance for purposes of comparison with the double-winding solenoid inductor 70 embodiment.

The inductance, L, of a solenoid inductor may be approximated according to equation (1)

$$L \approx \frac{\mu_0 \cdot \mu_r \cdot SF \cdot N \cdot W_m \cdot t_m}{P}, \quad (1)$$

where $\mu_0$ is the permeability of free space (or magnetic constant), $\mu_r$ is the relative permeability of the magnetic core, SF is the shape factor of the magnetic core, N is the total number of turns of all the windings, $W_m$ is the width of the magnetic core, $t_m$ is the thickness of the magnetic core, and P is the pitch of the windings, such that the product of P and N approximates the length of each winding. Thus, it may be observed that for a given magnetic core, the inductance will largely be determined by the pitch P and number of turns N of the solenoid inductor.

In the example of FIG. 7, the embedded double-winding solenoid inductor 70 and the conventional single-winding solenoid inductor 71 are assumed to have the same magnetic core, the same pitch P of the turns, and the same number of turns, e.g., 28 turns, such that their inductance is approximately equal, although the inductance of the embedded double-winding solenoid inductor 70 may be slightly different because of the slightly larger distance of the outer winding than the inner winding from the magnetic core.

In the example of FIG. 7, the 14-turn inner winding of the embedded double-winding solenoid inductor 70 has area dimensions X mm×Y mm, as shown. A comparable 14-turn portion of the conventional single-winding solenoid inductor 71 has similar dimensions, as shown. An extension of the single winding to add another 14 turns (shown in the dotted rectangle) for a total of 28 turns increases the area dimensions to X mm×1.86Y mm, as shown, for a total area of 1.86XY square millimeters. In contrast, adding another 14 turns of the outer winding (shown in the two dotted rectangles) to the embedded double-winding solenoid inductor 70 increases the area dimensions to 1.18X mm×Y mm, as shown, for a total area of 1.18XY square millimeters, which represents an area reduction of approximately 37% over the conventional solution of extending the single winding along the Y dimension.

Thus, an advantage of embedded double-winding solenoid inductor embodiments described herein is a significant area reduction for comparable inductance. Stated alternatively, an advantage of embedded double-winding solenoid inductor embodiments described herein may be a significant increase in inductance-to-area ratio. Stated further alternatively, an advantage of embedded double-winding solenoid inductor embodiments relative to a similarly sized conventional single-winding solenoid inductor is that the double-winding solenoid inductor may enjoy increased inductance per device area due to an increase of the number of turns N. The increase in inductance is only approximately proportional to the increased number of turns added by the outer winding because of the slightly larger distance of the outer winding than the inner winding from the magnetic core. The embedded double-winding solenoid inductor embodiments may be particularly advantageous in situations where a given chip size restraint limits the maximum achievable inductance for a conventional single-winding solenoid inductor to an unacceptable value, but where the embedded double-winding solenoid inductor embodiments may achieve the needed inductance.

Another advantage of embedded double-winding solenoid inductor embodiments described herein is that no additional magnetic core material is required, which may result in reduced cost per inductance per area. For example, with respect to FIG. 7 it may be observed that the conventional single-winding solenoid inductor 71 requires approximately twice the amount of magnetic core material required by the embedded double-winding solenoid inductor 70 to achieve comparable inductance. Yet another advantage of embedded double-winding solenoid inductor embodiments described herein is that they may allow for magnetic cores with lower Y/X, or Length/Width aspect ratio. For example, with respect to FIG. 7 it may be observed that the conventional single-winding inductor 71 has approximately twice the Length/Width aspect ratio of the embedded double-winding solenoid inductor 70. Reducing the aspect ratio may result in an improvement of the magnetic properties of the core material, such as linearity of the magnetic permeability with respect to current, for example.

In one embodiment, a dual anti-wound inductor that uses a single winding layer with alternate lay similar to that described in U.S. patent application Ser. No. 16/709,036, filed Dec. 10, 2019 with inventors Jason W. Lawrence, John L. Melanson, and Eric J. King, entitled Current Control for a Boost Converter with a Dual Anti-Wound Inductor, may be constructed using a method similar to embodiments described herein.

Although embodiments have been described in which the solenoid inductor has two windings, i.e., a single inner winding and a single outer winding, other embodiments are contemplated in which the number of windings is greater than two, i.e., in which additional outer windings are included. For example, the method of FIG. 1 may be modified to construct a multi-winding solenoid inductor by using a layered process to position an inner winding around a magnetic core, position a second winding around the inner winding, position a third winding around the second winding, and position a fourth winding around the third winding. The layered process for positioning the third and fourth windings may include additional blocks similar to blocks 101 through 107 and 111 through 117, with additional processing at block 121 to create vertical conductors to electrically connect corresponding conductors of the bottom and top layers of the third winding and to electrically connect corresponding conductors of the bottom and top layers of the fourth winding. Still further, the method may be extended to even more windings around the four windings. In embodiments in which the windings are connected to create opposing magnetic fields in the magnetic material, the total number of windings should be an even number.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A method for constructing a solenoid inductor, comprising:
  - positioning an inner winding substantially around a magnetic core;
  - positioning an outer winding substantially around the inner winding;
  - using a layered process to perform said positioning the inner and outer windings;
  - processing a first conducting layer that is a bottom layer of the outer winding;
  - processing a first dielectric layer above the first conducting layer;
  - processing a second conducting layer above the first dielectric layer that is a bottom layer of the inner winding;
  - processing a second dielectric layer above the second conducting layer;
  - processing a magnetic core layer above the second dielectric layer;
  - processing a third dielectric layer above the magnetic core layer;
  - processing a third conducting layer above the third dielectric layer that is a top layer of the inner winding;
  - processing a fourth dielectric layer above the third conducting layer;
  - processing a fourth conducting layer above the fourth dielectric layer that is a top layer of the outer winding; and
  - processing a fifth dielectric layer above the fourth conducting layer;
  - wherein the inner and outer windings are electrically connected.

2. The method of claim 1, wherein said using the layered process further comprises:
  - processing vertical conductors through the first, second, third and fourth dielectric layers to electrically connect the bottom and top layers of the outer winding; and
  - processing vertical conductors through the second and third dielectric layers to electrically connect the bottom and top layers of the inner winding.

3. The method of claim 2, wherein said using the layered process further comprises:
  - for each conducting layer of the first, second, third and fourth conducting layers:
  - separating the conducting layer into multiple conductors;
  - wherein said processing vertical conductors through the first, second, third and fourth dielectric layers to electrically connect the bottom and top layers of the outer winding comprises electrically connecting corresponding ones of the multiple conductors of the bottom and top layers of the outer winding to form corresponding turns of the outer winding; and
  - wherein said processing the vertical conductors through the second and third dielectric layers to electrically connect the bottom and top layers of the inner winding comprises electrically connecting corresponding ones of the multiple conductors of the bottom and top layers of the inner winding to form corresponding turns of the inner winding.

4. The method of claim 1, wherein the inner and outer windings are electrically connected serially to generate non-opposing magnetic fields in the magnetic core.

5. The method of claim 4, further comprising:
  - positioning additional windings substantially around the inner and outer windings using the layered process;
  - wherein each successive additional winding of the additional windings is substantially positioned around previous additional windings; and
  - wherein the inner and outer and additional windings are electrically connected serially and in a manner such as to generate non-opposing magnetic fields in the magnetic core.

6. The method of claim 1, wherein the inner and outer windings are electrically connected to generate opposing magnetic fields in the magnetic core.

7. The method of claim 6, wherein the inner and outer windings have different numbers of turns.

8. The method of claim 7, wherein the different numbers of turns provide substantially matching respective inductance values of the inner and outer windings.

9. The method of claim 6, further comprising:
  - positioning an even number of additional windings substantially around the inner and outer windings using the layered process;
  - wherein each successive additional winding of the additional windings is substantially positioned around previous additional windings; and
  - wherein the inner and outer windings and additional windings are electrically connected in a manner such that an outer half of all the windings layers generate magnetic fields in the magnetic core that oppose magnetic fields generated in the magnetic core by an inner half of all the windings layers.

10. The method of claim 6, wherein the inner and outer windings have identical numbers of turns.

11. The method of claim 1, wherein the solenoid inductor is constructed as an integrated circuit device.

12. A solenoid inductor constructed according to the method of claim 1.

13. A solenoid inductor constructed according to the method of claim 2.

14. A solenoid inductor constructed according to the method of claim 3.

15. A solenoid inductor constructed according to the method of claim 4.

16. A solenoid inductor constructed according to the method of claim 5.

17. A solenoid inductor constructed according to the method of claim 6.

18. A solenoid inductor constructed according to the method of claim 7.

19. A solenoid inductor constructed according to the method of claim 8.

20. A solenoid inductor constructed according to the method of claim 9.

21. A solenoid inductor constructed according to the method of claim 10.

22. A solenoid inductor constructed according to the method of claim 11.

* * * * *